United States Patent [19]

Mason, III

[11] Patent Number: 4,702,783
[45] Date of Patent: Oct. 27, 1987

[54] ADHESIVE TECHNOLOGY

[75] Inventor: William H. Mason, III, St. Paul, Minn.

[73] Assignee: Uncommon Conglomerates, Inc., Minneapolis, Minn.

[21] Appl. No.: 436,197

[22] Filed: Oct. 25, 1982

[51] Int. Cl.$^4$ .............................................. B32B 31/00
[52] U.S. Cl. .................................... 156/64; 101/127.1;
  101/128.1; 101/128.21; 101/128.4; 156/305;
  156/307.3; 156/314; 156/331.2; 156/344
[58] Field of Search ...................... 156/64, 307.3, 108,
  156/314, 305, 331.2, 160, 163, 247, 344; 428/38,
  247, 137, 255; 160/371; 101/127.1, 128.1,
  128.21, 128.4; 29/160; 526/298

[56] References Cited

U.S. PATENT DOCUMENTS

| 2,794,788 | 6/1957 | Coover et al. | 156/153 |
| 3,260,637 | 7/1966 | Von Bramer | 156/314 |
| 3,483,870 | 12/1969 | Coover et al. | 424/81 |
| 3,591,438 | 7/1971 | Toback et al. | 156/310 |
| 3,903,055 | 9/1975 | Buck | 526/298 |
| 4,096,308 | 6/1978 | Reed | 428/247 |
| 4,134,340 | 1/1979 | Larson | 101/127.1 |
| 4,186,660 | 2/1980 | Key | 101/128.4 |
| 4,297,160 | 10/1981 | Kusayama et al. | 156/344 |
| 4,381,248 | 4/1983 | Lazar | 156/344 |

*Primary Examiner*—John J. Gallagher
*Attorney, Agent, or Firm*—Anthony G. Eggink

[57] ABSTRACT

A process for chemically bonding a screen fabric material to a frame structure for serigraphic printing purposes. The bonding or fastening process includes, providing a screen fabric material in taut communication to peripheral portions of a frame structure. A cyanoacrylate based adhesive is applied to the screen fabric portions in communication with the frame periphery. A chemically basic catalyst is then brought in contact with the applied cyanoacrylate adhesive to activate or accelerate the anionic polymerization of the applied adhesive for quick curing thereof. The use of methylcyanoacrylate, ethylcyanoacrylate and isopropylcyanoacrylate adhesives are provided for specific end-use purposes. A basic catalyst, in a spray mixture, consisting of aromatic amines is used for quick and easy anionic polymerization of the cyanoacrylate based adhesive. And, a compatible dye for use in conjuction with the cyanoacrylate adhesives is provided for distinguishing the various cyanoacrylate adhesive structures, and to aid in the proper application of the cyanoacrylate adhesives to the screen fabric portions in communication with the frame structure.

17 Claims, No Drawings

ADHESIVE TECHNOLOGY

This invention relates to adhesive technology for fastening fabrics to a variety of substrates. Particularly, this invention relates to the fastening or bonding of screen fabrics to rigid frames, as utilized in serigraphic printing processes.

Because of the qualitative printing results obtained, many industries utilize serigraphic or screen printing processes. Of primary concern in these printing processes, however, is the securing of the screen fabric material in a taut configuration to the peripheral portions of a frame structure. It is the frame structure with the screen fabric fastened tautly thereto that is utilized with a stencil to provide ink to an object in the serigraphic printing process.

In the past, wooden frames were utilized, and the screen fabric, such as silk screen, was fastened to the wooden frames by mechanical means, such as ropes or staples. The limitations of wooden frames, such as deterioration, warping and bending, caused the industry to utilize non-wooden frame structures, such as steel, aluminum, etc. The use of these latter frame structures has developed the desirability of the use of adhesives for securing the screen materials to their respective peripheries.

The adhesives that have been utilized and proposed in the past have consisted primarily of the polyester, acrylic, epoxy, and polyurethane based type. However, each of these has drawbacks that are inherent in their respective structure or use. For example, slow curing time, the requirement of two component mixing, short pot life, and toxicity concern has made their respective use in the serigraphic printing industry costly, inconsistent, labor intensive, and, therefore, undesirable.

The adhesive technology of this invention provides the use of cyanoacrylate adhesives with a curing accelerator to quickly bond fabrics to various substrates. And, the invention provides for an efficient and quick process utilizing the cyanoacrylate adhesives with a spray accelerator or activator mixture to quickly bond or fasten a screen fabric material, in a taut configuration, to a peripheral frame structure for serigraphic printing purposes.

Additionally, this invention provides the use of colored or dyed cyanoacrylate adhesives which permit the user to readily identify various types of cyanoacrylate adhesive structures, which are suitable for particular purposes, and to aid the user in the proper application of the particular cyanoacrylate adhesive.

The cyanoacrylate adhesives provided by this invention permit those in the serigraphic printing industry with a method of preparing a screen fabric frame in an easy and quick manner. The screen fabric frames that result from the process of this invention are cohesive in structure for use, yet, are easily repairable, and are initially constructed in a manner which overcomes those problems, difficulties and shortcomings presented by the prior art adhesives, discussed above.

In summary, this invention provides a method of bonding or fastening a screen fabric to a peripheral frame structure for serigraphic printing use. The method consists of providing a screen fabric material in taut configuration in communication with a peripheral, rigid frame structure. A quantity of cyanoacrylate based adhesive is applied to the fabric material areas in communication with the frame structure. Next, a basic catalyst is applied to the cyanoacrylate adhesive to accelerate its cure through anionic polymerization.

Also provided by this invention is the use of particular cyanoacrylate based adhesives for particular end-use requirements. A methylcyanoacrylate adhesive is provided, as are an ethylcyanoacrylate and an isoprpylcyanoacrylate adhesive. Their respective viscosities and chemical properties provide adhesive uses particularly useful for specific fabric mesh counts and types of frame surfaces to which the taut fabric is bonded.

Additionally provided by this invention is the use of particular basic catalysts, such as aromatic amines, which accelerate the anionic polymerization to cure the cyanoacrylate based adhesives. Particularly, a catalyst for spray application is taught to easily and quickly cure the cyanoacrylate adhesive placed on the taut screen fabric portions in communication with the periperal frame structure.

And, finally provided by this invention is the use of dye that is compatible with the cyanoacrylate based adhesives which permit a user readily differentiate the various types of cyanoacrylate compounds, and which readily indicate to the user that a proper amount of adhesive has been provided at the required areas of screen to frame structure locations.

These and other benefits of this invention will become clear from the following detailed description.

In the process of serigraphic printing, often referred to as silk screen printing, a screen fabric material is utilized. It is through the apertures or holes in the screen fabric through which the various colored inks are transferred to the object to be printed.

It is essential that the screen fabric material is in a taut configuration so that uniformity of print, through ink transfer, is The taut screen fabric material, therefore, is commonly realized. The taut screen fabric material, therefore, is commonly attached, bonded or otherwise secured to a frame structure. The frame structure, although generally planar in configuration, can be curvilinear in cross section, and generally is in the configuration of the object to be printed. These objects can be wearing apparel, packaging materials, or rigid objects. The serigraphic printing process is quite versatile in application.

The process of this invention secures or bonds the screen fabric, in a taut configuration, to the peripheral portions of the frame structure. The taut screen fabric is utilized to carry the appropriate stencil utilized in the printing process, and it is the resiliency of the taut screen fabric that provides the fine and clear printing. It is, therefore, imperative that the screen fabric is fastened, and remains fastened, in a taut configuration to the frame structure.

Although a screened frame, subsequent to washing or cleaning, can be repeatedly utilized, the screen fabric must occasionally be replaced. For example, a torn screen fabric, must be rescreened. The bonding or fastening of the fabric that results from the process of this invention permits the fabric to be peeled from the frame structure so that this operation can be easily accomplished.

Generally, the types of frames utilized in the serigraphic printing industry consist of wooden, metal, aluminum or other metallic alloy frames, both painted or unpainted. And, the types of screen fabric materials utilized consist of polyesters, nylons, silk, cotton, or similar screened materials. The fabrics, depending upon specific application, vary in mesh count, i.e., the number of apertures per unit length. The processes of this invention provide a a quick and strong bonding between the above mentioned materials and substrates.

Initially, the screen frame structure must be clean to obtain an optimum adhesive bond. The cleansing of the frame structure with a solvent, such as alcohol, will ensure the removal of dirt, old paint, grease, and the like.

Next, the frame structure is placed in communication or in intimate contact with a tensioned or taut screen fabric material. And, it is ultimately desirable to fasten or bond that taut fabric material, in that specific configuration, to the peripheral and communicating portions of the frame structure. Continual peripheral bonding results in screen uniformity, and provides stress decentralization or spreading to elongate the useful life of the combined fabric/frame structure.

It is now possible, with fabric/frame contact, to apply, from a squeeze-type bottle, for example, a quantity of cyanoacrylate base adhesive. And, depending upon adhesive viscosity, the adhesive is spread out to ensure proper contact at all peripheral frame locations where the screen fabric is in communication.

Although the cyanoacrylate base adhesive will slowly cure by contact with moisture, alcohol or other caustic materials, an accelerator or catalyst is next applied to increase the anionic polymerization process which transforms the cyanoacrylate, by cross-linking, to a cured or hardened state. As is known in the art, the vinyl group in the cyanoacrylate structure provides the site for the anionic polymerization process.

It has been found that methylcyanoacrylate, ethylcyanoacrylate and isopropylcyanoacrylate adhesives are particularly useful in the processes described above. These adhesives do however, display varying characteristics that are desirable for particular bonding purposes. The methylcyanoacrylate adhesive is generally of a low viscosity suited for screen fabrics having a mesh count in excess 280 per inch. The ethylcyanoacrylate adhesive is of a generally higher viscosity and thus useful for screen fabrics of a lower mesh count; for example, a count of less than 280 per inch. The isopropylcyanoacrylate adhesive has been found suited for screen fabric bonding that requires a very high peel strength, for example, where printing close to the frame is subsequently required. Alternatively, a double coat of methyl or ethylcyanoacrylate adhesive to encapsulate the fabric, subsequent to initial cure, will also aid in more demanding strength requirement situations.

The surface conditioning accelerator or catalyst for quickly cross-linking or curing the cyanoacrylate adhesive for bonding or fastening purposes is accomplished by the introduction of a basic chemical compound. It has been found particularly useful to utilize an aromatic amine chemical structure to accomplish this quick curing as a result of the anionic polymerization that it induces. And, for efficient screen-to-frame fastening purposes, a spray or aerosol propelled aromatic amine, generally less than ten per cent in content, provides the best means to apply the accelerator to the adhesive previously applied to the fabric. A light coat of the spray accelerator, at room temperature, will provide a satisfactorily cured bond in often less than ten to thirty seconds. Of course, at lower ambient or surface temperatures, an increased amount or quantity of accelerator should be applied; and, visa versa.

For fabric repair, the activator is preferably first sprayed onto the fabric, and after its evaporation, a quantity of adhesive is applied. With respect to the normal sequential steps for bonding, a prospective bond failure is detectable by white film appearance. This is generally the cause of either the use of too much adhesive, its uneven spreading, or the use of too much activator.

Because the cyanoacrylate base adhesives are clear in appearance, it is often difficult to ascertain the sufficiency of the adhesive application, and the differences between the various adhesives themselves, i.e., methyl, ethyl or isopropyl in structure. Thus, a dye is preferably added to provide this capability. Although difficult to color, as known in the prior art, dyes according to those of U.S. Pat. No. 4,297,160 have been found suitable for this purpose. Additionally, antioxidant stabilization is provided to the cyanoacrylic adhesive. Thus, a different color dye is provided for the respective adhesives discussed above.

To maximize shelf life of the cyanoacrylic adhesives, they are provided in a generally oxygen and ultra-violet light impermeable container. Although inhibitors, stabilizers and anti-oxidants may be provided in the adhesive mixture, it is generally pure.

The accelerator, preferably the aromatic amines, are suitably propelled by an aerosol, such as freon, and stored in epoxy lined containers.

In summary, the fabric adhesive process provides for the quick and easy bonding of fabric to a variety of substrates. These include fabric, metal, wood, and, the like. Particularly, for serigraphic printing purposes, a screen fabric/frame structure bond with high shear and tensile strength, and lower peel strength, is suitably provided. The lower peel strength provides for easy disassembly of the bonded structure. The isopropylcyanoacrylate provides a median viscosity adhesive which also results in higher peel strengths.

The ethylcyanoacrylate adhesive has been found useful when dip tank use in the printing process is encountered. Additionally, its higher viscosity is useful as a gap filler when wooden or uneven frame structures are utilized.

As discussed above, predetermined frame structures, planar or cylindrically cross-sectioned, are bonded with screen fabric for serigraphic use by cleaning the frame to remove grease and dirt, stretching the fabric in taut configuration over the frame in contact with the frame, applying the cyanoacrylate based adhesive, spreading the adhesive over the fabric/frame communication periphery, and spraying the activator to the adhesive. Subsequent to trimming and washing, the screen fabric bonded frame structure is ready for use. A nitromethane debonder is provided for safety and like purposes.

Serigraphic screen frames produced according to the processes of this invention have provided efficient and long-life results.

As changes are possible to the processes of this invention, utilizing the teachings thereof, the description above should be viewed in the illustrative, and not in the limited, sense.

That which is claimed is:

1. A process for quickly and removably fastening a screen fabric material to a frame structure for serigraphic printing use, said process utilizing a cyanoacrylate based adhesive to secure the screen fabric to the frame structure with a bond having a high shear strength resistance and a low peel strength, said process comprising the following steps in the sequence set forth:

(a) providing a meshed screen fabric material being essentially in taut and touching communication with the peripheral surface of a frame structure, (b) applying a cyanoacrylate based adhesive to said screen fabric portions in communication with said frame structure to contact the adhesive with the frame structure through the mesh of the screen fabric, said cyanoacrylate based adhesive being selected from a group consisting essentially of methylcyanoacrylate, ethylcyanoacrylate and isopropylcyanoacrylate, said cyanoacrylate based adhesive further having a colored dye therein to aid a user in the proper application of the adhesive, and, (c) spraying a chemically basic catalyst to said cyanoacrylate based adhesive applied to said frame structure through the screen fabric mesh, said basic catalyst accelerating the anionic polymerization of said cyanoacrylate adhesive, said chemically basic catalyst further being an aromatic amine.

2. The process of claim 1, wherein said aromatic amine is sprayed by means of an aerosol propellant.

3. The process of claim 2, wherein said aromatic amine spray contains less than ten percent aromatic amine by volume.

4. The process of claim 2, wherein said aerosol propellant is freon.

5. The process of claim 4, wherein said aerosol propellant is provided in an epoxy lined container.

6. The process of claim 1, wherein said cyanoacrylate based adhesive provided is essentially isopropylcyanoacrylate based.

7. The process of claim 6, wherein said serigraphic printing use includes the requirement of printing close to the inner edge of the frame structure.

8. The process of claim 1, wherein the cyanoacrylate based adhesive is provided with an antioxidant stabilizer.

9. The process of claim 1, wherein the cyanoacrylate based adhesive is provided in a squeeze type bottle having a generally oxygen and ultra-violet light impermeable structure.

10. The process of claim 1, wherein the cyanoacrylate based adhesive provided is essentially ethylcyanoacrylate based having a generally higher viscosity for use with fabrics having a mesh count of less than 280 per inch.

11. A process for quickly and removably fastening a screen fabric material to a frame structure for serigraphic printing use, said process providing the use of an adhesive having a high shear strength resistance for securing the screen material to the frame structure and having a low peel strength for permitting the removal of the screen material from the frame structure, said process consisting essentially of the following steps in the sequence set forth:

(a) providing a meshed screen fabric material for serigraphic printing use, (b) stretching the screen fabric material essentially in taut and touching communication with the peripheral surface of a frame structure, (c) applying a cyanoacrylate based adhesive to said screen fabric portions in communication with said frame structure to contact the adhesive with the frame structure through the mesh of the screen fabric, said cyanoacrylate based adhesive being selected from the group consisting essentially of methylcyanoacrylate, ethylcyanoacrylate and isopropylcyanoacrylate, and (d) spraying a chemically basic catalyst to said cyanoacrylate based adhesive applied to said frame structure through the screen fabric mesh, said basic catalyst accelerating the anionic polymerization of said cyanoacrylate adhesive, said basic catalyst spray further being provided with an aerosol propellant.

12. The process of claim 11, wherein said screen fabric material is selected from the group of polyester, nylon, silk and cotton materials.

13. The process of claim 11, wherein said frame structure is made of wood, metal, aluminum or other metallic material.

14. The process of claim 11, including a step wherein the frame structure is initially cleaned with a solvent.

15. The process of claim 11, wherein the basic catalyst provided is an aromatic amine contained in an epoxy lined container having, by volume, less than 10 percent aromatic amine, and wherein the propellant is freon.

16. The process of claim 11, wherein said cyanoacrylate based adhesive provided further has a colored dye therein to aid a user in the proper application of the adhesive.

17. The process of claim 11, wherein the cyanoacrylate based adhesive provided is essentially an isopropylcyanoacrylate based adhesive, and wherein the the serigraphic printing use includes the requirement that printing is necessitated in proximity to the inner edges of the frame structure.

* * * * *

REEXAMINATION CERTIFICATE (1277th)
United States Patent [19]
Mason, III

[11] B1 4,702,783
[45] Certificate Issued   May 8, 1990

[54] ADHESIVE TECHNOLOGY

[75] Inventor: William H. Mason, III, St. Paul, Minn.

[73] Assignee: Uncommon Conglomerates, Inc., Minneapolis, Minn.

Reexamination Request:
No. 90/001,631, Oct. 21, 1988

Reexamination Certificate for:
Patent No.: 4,702,783
Issued: Oct. 27, 1987
Appl. No.: 436,197
Filed: Oct. 25, 1982

[51] Int. Cl.$^5$ .............................................. B32B 31/00
[52] U.S. Cl. .................................... 156/64; 101/127.1; 101/128.1; 101/128.21; 101/128.4; 156/305; 156/307.3; 156/314; 156/331.2; 156/344
[58] Field of Search ............ 29/160; 101/127.1, 128.1, 101/128.21, 128.4; 156/64, 108, 160, 163, 247, 305, 307.3, 314, 331.2, 344; 160/371; 428/38, 137, 247, 255; 526/298

[56] References Cited

U.S. PATENT DOCUMENTS

| | | | |
|---|---|---|---|
| 2,794,788 | 6/1957 | Coover et al. | 156/153 X |
| 3,260,637 | 7/1966 | Von Bramer | 156/314 |
| 3,483,870 | 12/1969 | Coover et al. | 424/81 |
| 3,591,438 | 7/1971 | Toback et al. | 156/310 |
| 3,903,055 | 9/1975 | Buck | 526/298 |
| 4,096,308 | 6/1978 | Reed | 428/247 |
| 4,134,340 | 1/1979 | Larson | 101/127.1 |
| 4,186,660 | 2/1980 | Key | 101/128.4 X |
| 4,297,160 | 10/1981 | Kusayama et al. | 156/344 X |
| 4,381,248 | 4/1983 | Lazar | 156/344 X |

OTHER PUBLICATIONS

Four page booklet entitled "Screen Systems Screen Fabric Adhesive 4200/4300 Series".
Three panel brochure entitled "Screen Systems Screen Fabric Adhesive 4200/4300 Series".

*Primary Examiner*—Robert A. Dawson

[57] ABSTRACT

A process for chemically bonding a screen fabric material to a frame structure for serigraphic printing purposes. The bonding or fastening process includes, providing a screen fabric material in taut communication to peripheral portions of a frame structure. A cyanoacrylate based adhesive is applied to the screen fabric portions in communication with the frame periphery. A chemically basic catalyst is then brought in contact with the applied cyanoacrylate adhesive to activate or accelerate the anionic polymerization of the applied adhesive for quick curing thereof. The use of methylcyanoacrylate, ethylcyanoacrylate and isopropylcyanoacrylate adhesives are provided for specific end-use purposes. A basic catalyst, in a spray mixture, consisting of aromatic amines is used for quick and easy anionic polymerization of the cyanoacrylate based adhesive. And, a compatible dye for use in conjunction with the cyanoacrylate adhesives is provided for distinguishing the various cyanoacrylate adhesive structures, and to aid in the proper application of the cyanoacrylate adhesives to the screen fabric portions in communication with the frame structure.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

* * * * *